United States Patent
Rosenhouse

(10) Patent No.: US 10,623,390 B1
(45) Date of Patent: Apr. 14, 2020

(54) SIDECAR-BACKED SERVICES FOR CLOUD COMPUTING PLATFORM

(71) Applicant: Pivotal Software, Inc., San Francisco, CA (US)

(72) Inventor: Gabriel Rosenhouse, Los Angeles, CA (US)

(73) Assignee: Pivotal Software, Inc., San Francisco, CA (US)

( * ) Notice: Subject to any disclaimer, the term of this patent is extended or adjusted under 35 U.S.C. 154(b) by 405 days.

(21) Appl. No.: 15/686,042

(22) Filed: Aug. 24, 2017

(51) Int. Cl.
*H04L 29/06* (2006.01)
*H04L 29/08* (2006.01)

(52) U.S. Cl.
CPC .......... *H04L 63/08* (2013.01); *H04L 63/0263* (2013.01); *H04L 63/166* (2013.01); *H04L 67/1002* (2013.01)

(58) Field of Classification Search
CPC ... H04L 63/08; H04L 67/10; H04L 29/12009; G06F 21/629
USPC .............................................. 726/5
See application file for complete search history.

(56) References Cited

U.S. PATENT DOCUMENTS

| | | | | |
|---|---|---|---|---|
| 2006/0165074 A1* | 7/2006 | Modi | ................ | H04L 29/12367 370/389 |
| 2006/0168149 A1* | 7/2006 | Dispensa | .......... | H04L 29/12009 709/219 |
| 2011/0208838 A1* | 8/2011 | Thomas | ................... | H04L 29/06 709/219 |
| 2011/0219113 A1* | 9/2011 | Grewal | ................... | G06F 15/16 709/224 |
| 2018/0062849 A1* | 3/2018 | Pope | ................... | G06F 9/45558 |
| 2018/0131583 A1* | 5/2018 | Barrows | ................. | H04L 67/16 |
| 2018/0144117 A1* | 5/2018 | Engler | .................... | G06F 21/44 |
| 2018/0165070 A1* | 6/2018 | Khambay | ............... | G06F 9/541 |

OTHER PUBLICATIONS

Hofmann et al. Dec. 2016, IBM Redbooks, Microservices Best Practices for Java, pp. 1-134.*
Sellami et al, 2013, IEEE, PaaS-Independent Provisioning and Management of Applications in the Cloud, pp. 693-700.*
Unknown author, "Services—Kubernetes," (Aug. 2017) [online] (retrieved from https://kubernetes.io/docs/concepts/services-networking/service/), 19 pages.

* cited by examiner

*Primary Examiner* — Alexander Lagor
*Assistant Examiner* — Jenise E Jackson
(74) *Attorney, Agent, or Firm* — Fish & Richardson P.C.

(57) ABSTRACT

This specification describes methods, systems, and computer-readable media for sidecar-backed services for a cloud computing platform. An application is bound to a service. A transformer component of the cloud computing platform transforms credential information for accessing the service by replacing an access address to the service with a localhost address to a sidecar program associated with the application. When the application uses the service, the application communicates with the sidecar program rather than with the service directly. The sidecar program then forwards the communication to the service.

20 Claims, 4 Drawing Sheets

US 10,623,390 B1

SIDECAR-BACKED SERVICES FOR CLOUD COMPUTING PLATFORM

BACKGROUND

This specification generally relates to cloud computing techniques.

In cloud computing, a set of shared computing resources, storage resources, and network resources can be provisioned to users, generally in the form of virtual machines. Multiple physical computing appliances, e.g., computers in a server farm, can provide a service platform for provisioning these resources. The service platform is sometimes referred to as infrastructure as a service (IaaS). An example of a cloud computing platform is a Pivotal Cloud Foundry® software product deployed on a set of cloud appliances. Applications executing on a cloud computing platform can consume one or more services. A service can include hardware and software that the applications use over a network as part of the executions. For example, a service can include a database, e.g., MySQL™ or a messaging service, e.g., RabbitMQ®. During execution, the applications may need to discover, connect to, and load-balance various services. An application can consume a particular service if, at deployment time, the application is bound to that service. An application can use multiple services. A service can be used by multiple applications.

SUMMARY

This specification describes methods, systems, and computer-readable media for sidecar-backed services for a cloud computing platform. A transformer component of the cloud computing platform receives binding information from a cloud controller of the cloud computing platform. The binding information specifies that an application may use a service provided on the cloud computing platform. The transformer receives, from the cloud controller, credential information about the service. The credential information includes an access address to the service. The transformer generates redacted credential information, by replacing the access address with a localhost address that points to a sidecar program associated with the application. The transformer provides the redacted credential information to a cell representative or a bulletin board system. The redacted credential information can cause the application to access the sidecar program at the localhost address when using the service. The transformer provides the received credential information and the redacted credential information to the sidecar program. The received credential information and the redacted credential information can cause the sidecar program to listen at the localhost address and to communicate with the service at the access address in response to receiving a request from the application through the localhost address.

Particular embodiments of the subject matter described in this specification can be implemented to realize one or more of the following advantages. In a network-centric cloud computing platform where applications connect to multiple deployed services, the disclosed techniques can help an operator maintaining fine-grained security policies between the applications and the services they use. Compared to conventional techniques where the security policies are implemented in the applications, the disclosed techniques where the applications communicate with services through sidecars improves security by standardizing security measures and handling security transparently to the applications, thereby reducing or eliminating potential security holes caused by human error.

The disclosed techniques can help managing identities outside of the cloud computing platform. For example, an operator facing regulatory compliance issues may need to have a small set of static Internet Protocol (IP) addresses that correspond to a particular application. This setup can allow the operator to whitelist only that particular application at an IP firewall protecting a legacy database. The transformation described in this specification allows the operator to create an architecture where sidecar programs implement an additional layer of authentication and authorization in the whitelist. The architecture can reduce security requests to and workload of a security administrator.

The disclosed techniques can allow an operator to maintain a polyglot microservice mesh. As application developers on a team build a constellation of microservices on a cloud computing platform, the disclosed techniques allow the platform to provide service discovery, client-side load-balancing, circuit-breaking, and other modern glue features for creating and maintaining the mesh, so that an operator or manager does not have to solve those problems separately in every language that developers in the team would use. The disclosed techniques can be language agnostic and infrastructure agnostic, improving compatibility between components that are written in different programming languages.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
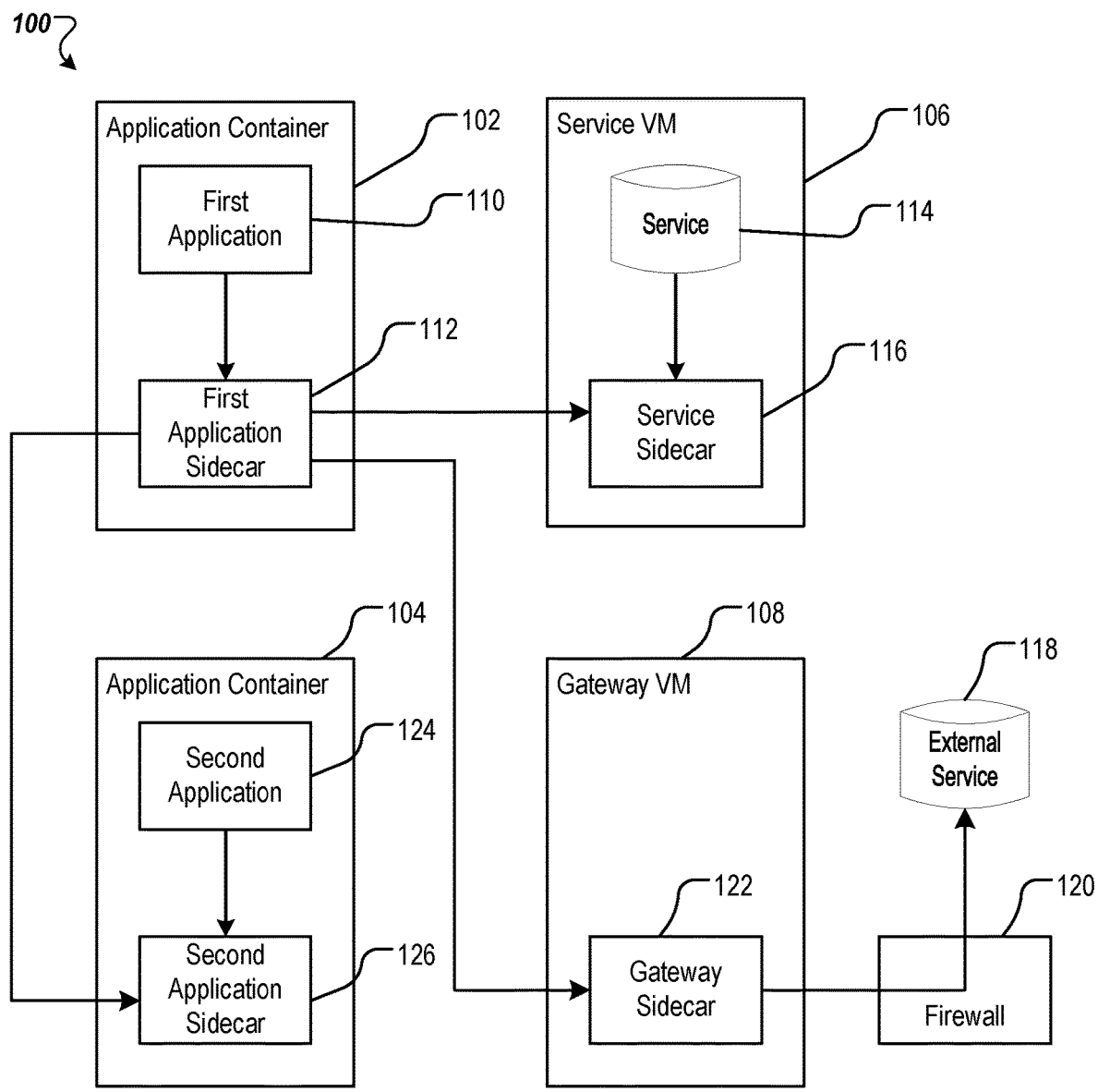
FIG. 1 is a block diagram illustrating example sidecar-backed services on a cloud computing platform.

FIG. 1 is a block diagram illustrating example sidecar-backed services on a cloud computing platform. The sidecar-backed services can be implemented as a sidecar mesh 100 that includes one or more application containers, e.g., a first application container 102 and a second application container 104, a service virtual machine 106, and a gateway virtual machine 108.

An application container, e.g., the application container 102, can include an isolated instance of user space on a computer, the user space being configured to store files, libraries, and associated programs. The application container 102 can be used to deploy and execute an application program, e.g., a first application 110. In the application container 102, a first sidecar program 112 is associated with the first application 110. For convenience, a sidecar program that is associated with an application, such as the sidecar program 112 associated with the application 110, is referred to as an application sidecar in various parts of this specification.

The first sidecar program 112 is a program that is separate from the first application 110. The first sidecar program 112 executes alongside the application 110 and provides multiple network related features to the application 110 via a proxy, e.g., a TCP (Transmission Control Protocol, at Layer 4) or HTTP (Hypertext Transfer Protocol, at Layer 7) proxy. For example, the first sidecar program 112 may expose a localhost HTTP listener that accepts connections from the first application 110 and proxies the connections to a remote service. With complete access to the connections to the remote service, the first sidecar program 112 is configured to negotiate MTLS tunneling, load balance to remote back ends, rate-limit, and perform other communication and security related tasks.

These tasks performed by the first sidecar program 112 can include the following examples. The first sidecar program 112 can discover where the service is on the network. The first sidecar program 112 can establish a secure connection to that service. The first sidecar program 112 can load-balance subsequent requests across multiple instances of the service, actions sometimes referred to as client-side load balancing. In addition, the first sidecar program 112 can implement one or more secondary features often required of the first application 110. The secondary features can include, for example, retry operations including re-establishing a connection if the connection was interrupted by a network outage. The secondary features can include rate-limiting outgoing requests if the service is overloaded. The secondary features can include forwarding metrics about the request, e.g. how long it took to serve the request, to a metric collector.

In some implementations, a network stack of the application container 102 is manipulated to redirect all outbound connections from the application 110 to the sidecar program 112 through destination network address translation (DNAT). In other implementations, the disclosed techniques allow selective DNAT through transformation based on service binding, which is described in additional details below.

The service virtual machine 106 can be a container for a service 114. The service 114, in this example, is a database. The service 114 can be associated with a sidecar program 116. For convenience, a sidecar program that is associated with a service, e.g., the sidecar program 116 associated with the service 114, is referred to as a service sidecar in various parts of this specification.

The application 110 can use the service 114 during execution. To use the service 114, the application 110 can bind with the service. During binding, a service broker component of the cloud computing platform can provide definitions of the service 114. A representation of the definitions, e.g., a JSON (JavaScript Object Notation) hash, can be represented in a service-binding environment variable, e.g., a VCAP SERVICES variable in Pivotal Cloud Foundry. During the binding operation, the cloud computing platform can place the definitions into the environment of the application 110 in the service-binding environment variable. To use the service 114, the application 110 can inspect this environment variable. In sidecar-backed service provision, the definitions are transformed to pointing to the first sidecar program 112. The first sidecar program 112 is responsible for proxying connections to the bound service 114.

In addition, the application 110 can be bound to an external service 118. The external service 118 can be a legacy database outside of a firewall 120. The cloud computing platform can provide a gateway virtual machine 108 for communicating with the external service 118. A sidecar program 122 inside the gateway virtual machine 108 can act as a proxy for the external service 118. For convenience, a sidecar program that is inside a gateway virtual machine, e.g., the sidecar program 122 inside the gateway virtual machine 108, is referred to as a gateway sidecar in various parts of this specification.

For each bound service, e.g., the service 114 and the external service 118, the first sidecar program 112 inside the application container 102 runs a TCP or UDP listener that listens to a localhost address that is assigned to the corresponding service. For example, the first sidecar program 112 can listen to a first localhost address including a first localhost hostname and a first port, e.g., 127.0.0.10:30001, for requests submitted by the application 110 to the service 114, and listen to a second localhost address including a second IP address and a second port, e.g., 127.0.0.10:30002, for requests submitted by the application 110 to the external service 118. The localhost hostname, e.g., IP address 127.0.0.10, can be a dedicated IP address that indicates a localhost of a computer on which the first sidecar program 112 resides.

To use the bound services, the application 110 inspects a service-binding environment variable, e.g., VCAP SERVICES, that indicates bound services. The environment variable, instead of storing representations of the hostnames and ports of the services, stores the localhost hostnames and ports corresponding to the services, at which the sidecar program 112 listens. For example, the service-binding environment variable can store representations of the localhost addresses 127.0.0.10:30001 and 127.0.0.10:30002 corresponding to the service 114 and external service 118, respectively.

The application 110 inspects the service-binding environment variable and discovers the localhost addresses that are occupied by the associated listener of the associated sidecar program 112. The application 110 then opens a TCP connection, or sends one or more UDP packets, to that listener. The sidecar program 112 then acts as a proxy to route the connection or packets to the service 114 and external service 118. The sidecar program 112 can perform client-side load balancing, circuit breaking, authorization, authentication, and other tasks.

Like the first application 110, a second application 124 can execute in a second application container 104. The second application 124 can be associated with a second sidecar program 126. The second sidecar program 126 can perform operations corresponding to the first sidecar program 112. In addition, the first application 110 can communicate with the second application 124 through the first sidecar program 112 and the second sidecar program 126. During the communication, each of the first application 110 and the second application 124 sends and receives information to and from respective localhost hostnames and ports. The first sidecar program 112 and the second sidecar program 126 handle inter-container and inter-computer communications, including discovery and authentication operations.

The sidecar mesh 100 enables applications 110 and 124 to operate independently from lower layers of the network stack of the of the cloud computing platform. The sidecar mesh 100 is infrastructure agnostic. The sidecar mesh 100 can provide cryptographic container authentication and authorization with minimal work for an application developer. Abstracting sidecar listeners behind a service binding and discovery model can allow an application developer, who may be familiar with service binding as a built-in discovery mechanism, to implement the sidecar mesh 100 easily.

Access to the service 114 may be enabled for some, but not all, applications. The service 114 may contain sensitive data. An ingress firewall can protect the service virtual machine 106 in which the service 114 executes. The ingress firewall can distinguish between an allowed application, e.g., the first application 110, and a disallowed application, e.g., the second application 124. The ingress security on the service virtual machine 106 is fine-grained and automatic, allowing traffic only from those applications that are bound to the service 114. Such security may rely on client-provided identity, mediated by a client application sidecar, e.g., the first application sidecar 112.

The service virtual machine 106 has a collocated job for a service sidecar program 116. The first application 110, which connects to its own application sidecar, the first sidecar program 112, runs inside the first application container 102. The first sidecar program 112 proxies to the service sidecar program 116 on the service virtual machine 106. The service sidecar program 116 then proxies to the service 114.

For example, the service 114 can be a MySQL service deployed, e.g., under BOSH, on a cloud computing platform, e.g., Pivotal Cloud Foundry. The service 114 is sidecar-enabled. A command line input can cause the cloud computing platform to create a service broker and enable service access. The example command line input is shown below in Listing 1. The examples shown in Listing 1 and other listings below are for Pivotal Cloud Foundry and for illustrative purpose. In various implementations on other platforms, other commands or configuration settings can be used.

>cf create-service-broker
>cf enable-service-access

Listing 1

A developer can create the service 114, bind the service to the application, and start the first application 110, for example, by using the command line input below as shown in Listing 2, where the service 114 is a MySQL service that has the name of "exampleDB" and the first application 110 has the name of "myApp."

>cf push myApp --no-start
>cf create-service MySQL 5 GB exampleDB
>cf bind-service myApp exampleDB
>cf start myApp Listing 2

When the first application 110 starts, the first application 110 finds service binding credentials in a service-binding environment variable, e.g., VCAP SERVICES. The service-binding environment variable, unlike a conventional service-binding environment variable, specifies a localhost address where the first sidecar program 112 listens. An example entry in a service-binding environment variable is shown below in Listing 3.

"MySQL": [
  {
    "name": "exampleDB",
    "plan": "5 GB",
    "credentials":
      "hostname": "127.0.0.10",
      "port": 30001,
      "username": "a_user_name",
      "password": "a-password",
      "name": "a-database-name"
    },
    "sidecar-enabled": true
  }
]

Listing 3

The "hostname" and "port" entries are transformed during or after service binding and before the first application 110 starts. The example entry in Listing 3 above enables the first application 110 to understand how to connect to the service 114 through the first sidecar program 112.

Based on the above example, after setup, data flows as follows. The first application 110 opens a TCP connection to localhost port at a localhost hostname, in this example, 127.0.0.10:30001. The first sidecar program 112 inside the first application container 102 accepts the connection. The first sidecar program 112 initiates a connection, e.g., a MTLS connection, to the service sidecar program 116 running on the service virtual machine 106. The service sidecar program 116 accepts the connection. The service sidecar program 116 validates that the connection is allowed. The validation can include inspecting a globally unique identifier, e.g., app-guide in a Pivotal Cloud Foundry platform, of the first application 110. The globally unique identifier can be stored in a client certificate. The service sidecar program 116 compares the identifier against known service bindings during validation. The service sidecar program 116 can also inspect a source IP address of the connection that is encoded in a subject alternative name (SAN) in the certificate. The service sidecar program 116 allows the connection upon successful validation.

Figure 2:
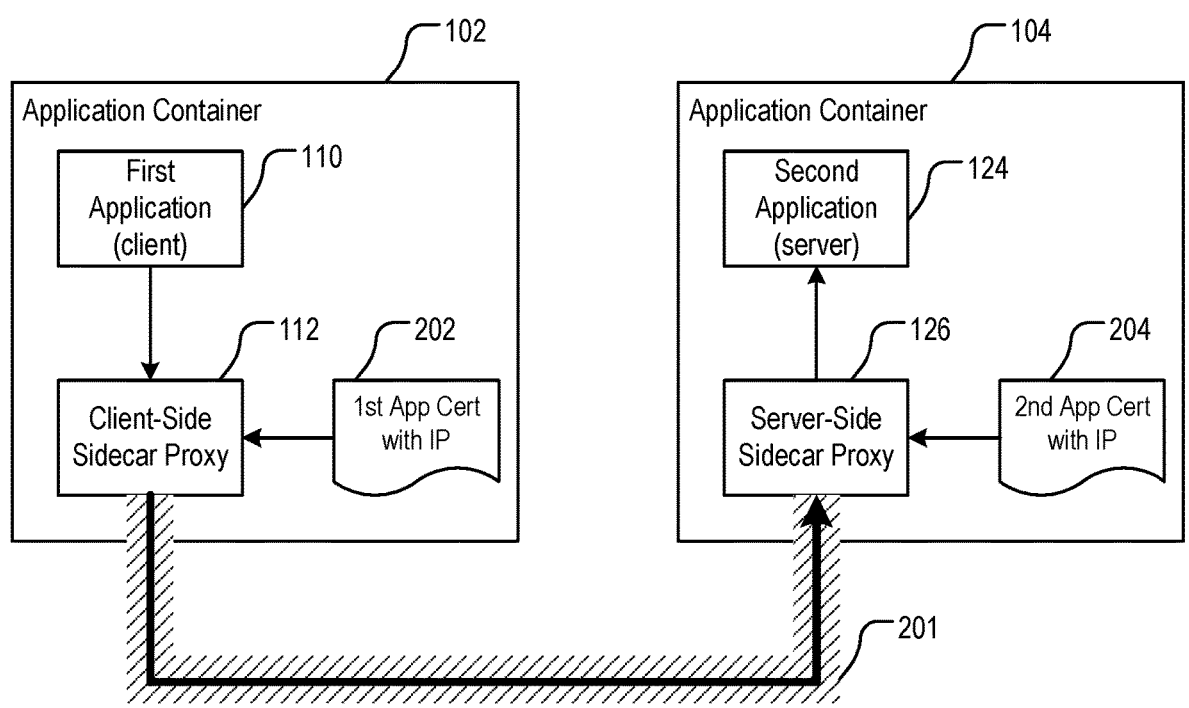
FIG. 2 is a block diagram illustrating example end-to-end communication through sidecar programs using a mutual transport layer security (MTLS) tunnel.

FIG. 2 is a block diagram illustrating example end-to-end communication through sidecars using an MTLS tunnel. A first application 110 executing in a first application container 102 communicates with a second application 124 executing in a second application container 104. In the example shown, the first application 110 acts as a client. The second application 124 acts as a server.

A first sidecar program 112 can be configured to act as a client proxy. A second sidecar program 126 can be configured to act as a service proxy. Each of the first application 110 and the second application 124 can use its respective protocol for communication. Each protocol can be an opaque protocol. The first application 110 and the second application 124 can use MTLS in the communication. The first sidecar program 112 and the second sidecar program 126 can communicate in a sidecar-to-sidecar MTLS tunnel 201. The first sidecar program 112 can maintain a first application certificate 202 with IP address. The second sidecar program 126 can maintain a second application certificate 204 with IP address.

Figure 3:
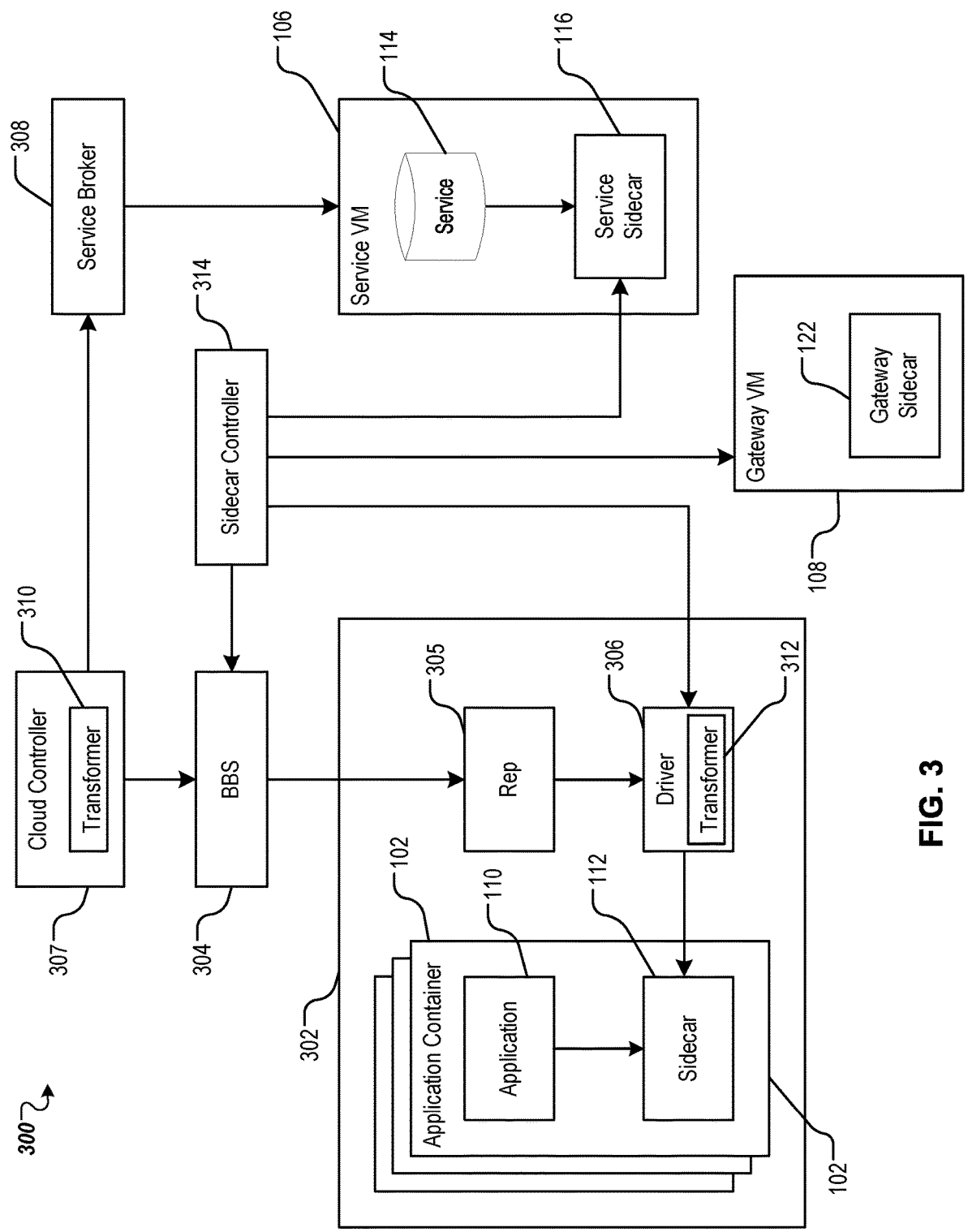
FIG. 3 is a block diagram illustrating example control structure of sidecar-backed services on a cloud computing platform.

FIG. 3 is a block diagram illustrating example control structure 300 of sidecar-backed services on a cloud computing platform. The control structure 300 includes a system having various components. Each component can be implemented on one or more processors executing computer instructions.

The application 110 and the sidecar program 112 execute in an application container 102. Logically, the application container 102 and other application containers are maintained in a cell 302 that manages and maintains tasks and long-running processes (LRPs). Each application container can execute a respective instance of the application 110. The cell 302 can execute application start and stop actions, manage application containers, and report execution status to a bulletin board system (BBS) 304. The BBS 304 stores disposable data including cell and application status, unallocated work, and heartbeat messages.

The cell 302 includes a cell representative 305. The cell representative 305, sometimes referred to as a rep, performs various tasks of coordinating with the BBS 304. For example, the cell representative 305 can maintain a presence record for the cell 302 in the BBS 304, participate in auctions to accept new tasks, run the application 110 by creating the application container 102 and then to run actions in the application container 102. In particular, the cell representative 305 communicates with a driver 306 the controls and configures the sidecar program 112.

A cloud controller 307 directs deployment of applications, including the application 110. The cloud controller 307 maintains records of organizations, spaces, user roles, and services, including the service 114. A service broker 308 provisions resources as the services. The cloud controller 307 submits a request to the service broker 308 indicating that the application 110 is to bind with the service 114. In response, the service broker 308 returns credentials information, e.g., a credentials block, describing how a client such as the application 110 can connect to the service 114. An example credentials block, as returned by the service broker 308, is shown below in Listing 4.

```
{
    "credentials":{
        "hostname": "example-host-guid.link.bosh",
        "port": "5432",
        "username": "a_user_name",
        "password": "a-password",
        "name": "a-database-name"
    },
    "sidecar-enabled": true
}
```

Listing 4

In the example shown, the "hostname" field and "port" field, in combination, store an access address including a service hostname, e.g., a URI or IP address, and a service port number. The access address indicates a path for accessing the service 114. A transformer can transform the credentials block by replacing the service address with a localhost address where the sidecar program 122 listens to requests. The transformer is a component of the control structure 300 that is implemented as a controller-side transformer 310 or a driver-side transformer 312. The transformer is configured to transform values of the "hostname" field and "port" field to a localhost hostname, e.g., "127.0.0.10" and a localhost port, e.g., "30001," respectively.

The application 110 can be bound to multiple services. The transformer can transform credentials blocks for all services in such a way that each service has a respective unique localhost address, e.g., a unique hostname:port pair, within the application container 102. The transformer can provide the transformed credentials block to the application 110, where the application 110 will submit requests to the sidecar program 112 at the localhost address. The transformer can provide both the transformed credentials block and the original credentials block to the sidecar program 112. The sidecar program 112 can maintain a mapping between localhost addresses and access addresses. The sidecar program 112 can forward the requests from the application 110 to the correct services based on the mapping.

Likewise, a service sidecar program 116 can maintain a mapping between a service address and a service-side localhost address where the service 114 listens. The service sidecar program 116 forwards received requests to a service-side localhost address, where the service 114 listens and provides responses.

The control structure 300 includes a sidecar controller 314. The sidecar controller 314 is configured to coordinate operations of the BBS 304, the driver 306, and communication between the client sidecar program 112 and service sidecar program 116. The sidecar controller 314 can maintain information about physical locations of the application container 102 and the service virtual machine 106.

The sidecar controller 314 can allow the application 110 to access an external, legacy service through the sidecar program 112. The external, legacy service can be a database that operates on a particular service address, e.g., IP address 1.2.3.4 on port 1521. A legacy, IP address-based firewall protects the external service. Security requirements may permit whitelisting only one or two IP addresses on this legacy firewall, and trusting that those IP addresses will only be used by a secure application, e.g., the application 110.

In some implementations, this work workflow will require an application developer to open a ticket with a security administrator in order to have the IP address of the application 110 whitelisted at the legacy firewall. The operator would need to place the application 110 in an isolation segment using a dedicated range of infrastructure IP addresses. No other applications would be allowed in that isolation segment. Scalability may be an issue under this architecture.

A proxy gateway service can solve this problem. A gateway virtual machine 108 can have a static IP address. A gateway sidecar program 122 runs in the gateway virtual machine 108. The gateway virtual machine 108 acts as proxy, e.g., a Layer 4 proxy, accepting MTLS connections from the application sidecar program 112 and proxies the connections, via the static IP address, to the legacy database. MTLS between the application sidecar program 112 and the gateway sidecar program 122 allows the gateway virtual machine 108 to validate the identity of the application 110 via a client certificate, e.g., in a same manner as the sidecar-to-sidecar examples above.

An operator can deploy the proxy gateway service using example commands in Listing 1. A developer can create a and bind the proxy gateway service using example commands as shown in Listing 5 below.

```
>cf push myApp --no-start -i 3
>cf create-service gateway high-availability legacyDB-
    Gateway\
    -c '{"proxyTo": "1.2.3.4:5432"}'
>cf bind-service myApp lagacyDB
```

Listing 5

The push command pushes or updates the application 110 without starting the application 110, by using the "--no-start" parameter. The push allows three instances by using the "-i" option. The "create-service" command creates two gateway service virtual machines that proxies connections to the example access address ("1.2.3.4:5432") where the legacy database ("legacyDB") resides. The path is provided inline, as a JSON object, using the "-c" option. Each virtual machine is assigned a static IP address from an operator-defined pool. The developer can open a ticket with a security system, and provide a service instance dashboard URL for managing service instances.

The security administrator receives the ticket, and logs into the service instance dashboard URL. The security administrator can discover that the service instance virtual machines have static IP addresses, e.g., 10.10.0.101 and 10.10.0.102. The security administrator can verify that the application 110 is indeed allowed to access the database, e.g., by examining the name, space, and organization of the application 110. The security administrator can add one or more whitelist rules to a legacy firewall to allow connections from the static IP addresses to the legacy database. The security administrator can then mark the ticket as resolved.

The application 110 can start, inspect a service-binding environment variable, and finds an entry for the legacy database that is directed to a localhost address. An example entry for a gateway service is shown below in Listing 6.

```
"gateway": [
  {
    "name": "legacyDBGateway",
    "plan": "high-availability",
    "credentials": {
      "hostname": "127.0.0.10",
      "port": 30002
    },
  }
]
```

Listing 6

At the point when setup is complete, two gateway service virtual machines have been deployed with statically assigned IP addresses of 10.10.0.101 and 10.10.0.102. The sidecar program 122 can be configured to listen to a particular port, e.g., port 6000, on each one. Three instances of application 110 are running in respective application containers. A sidecar program is running inside each application container, with a listener for the gateway service available at 127.0.0.10:30002. The application 110 knows, via the service-binding environment variable, how to connect to this service.

At execution time, to use the legacy database, the application 110 opens a connection, e.g., a TCP connection, at the localhost address, e.g., 127.0.0.10:30002. The sidecar program 112 accepts the connection. The sidecar program 112 initiates an MTLS connection to an access address, e.g., 10.10.0.102:6000, where the gateway sidecar program 122 is listening. The gateway sidecar program 122 accepts the connection. The gateway sidecar program 122 validates that the connection is allowed. The validation includes inspecting a globally unique identifier, e.g., app-guid in a Pivotal Cloud Foundry platform, of the first application 110 in a client certificate. The validation includes comparing the identifier against known service bindings. The validation can include validating a certificate hierarchy in a public key infrastructure. The service sidecar program 116 can also inspect a source IP address of the connection that is encoded in a subject alternative name in the certificate.

Upon successful validation, the gateway sidecar program 122 initiates a connection to the legacy database at the network address of the legacy database, in this example, 1.2.3.4:1521. The legacy firewall sees incoming connection from a whitelisted IP address 10.10.0.102, and allows the connection.

In some implementations, the application 110 executes in a polyglot microservice environment. The application 110 can be a frontend written in a first programming language, e.g., Ruby or Node.js. The frontend may communicate with a backend written in a second programming language, e.g., Python or Go. The frontend is exposed to a public network via a router. The backend is not exposed to the public network. The frontend is connected to the backend. The frontend and backend are load balanced.

The control structure 300 implements network policies that allow the application 110 to reach the backend application over the network. The application sidecar program 112 in the application container 102 opens a listener to proxy requests to one or more backend sidecars, e.g., the sidecar program 126 of FIG. 1. The backend sidecar forwards the requests to a local backend application instance.

A developer can push the application 110 and the backend application with "do not start" option, e.g., by using the "--no-start" parameter. A command-line input can create a service that corresponds to the backend application. An example input for creating the service is shown below in Listing 7.

```
>cf create-service app-service basic backendService\
    -c'{
       "apps": ["backend-1", "backend-2" ],
       "protocol": "tcp",
       "ports": "8080",
    }'
>cf bind-service myApp backendService
```

Listing 7

The above example commands creates a service "backendService" that includes applications "backend-1" and "backend-2" and binds the service to the application 110. The service binding allows rules to be installed and the sidecars to be configured. The service-binding environment variable can have the following example entry, as shown in Listing 8.

```
"app-service": [
  {
    "name": "backendService",
    "plan": "basic",
    "credentials": {
      "hostname": "127.0.0.10",
      "port": 30003
    },
  }
]
```

Listing 8

The application 110 can identify the entry and connect to the backend service accordingly. At execution time, to use the backend service, the application 110 opens a connection, e.g., a TCP connection, to the localhost address 127.0.0.10: 30003. The sidecar program 112 accepts the connection.

The sidecar program 112 uses service discovery and client-side load balancing logic to identify a backend instance. For example, the sidecar program 112 can pick a backend instance with an overlay IP address, e.g., 10.255.10.3. The sidecar program 112 initiates a MTLS connection to a backend sidecar. The backend sidecar accepts the connection. The backend sidecar validates that the connection is allowed. The validation includes inspecting a globally unique identifier, e.g., app-guid in a Cloud Foundry platform, of the first application 110 in a client certificate, and comparing the identifier against known service bindings. The backend sidecar can also inspect a source IP address of the connection that is encoded in a subject alternative name in the certificate. Upon successful validation, the gateway sidecar program 122 initiates a connection to the backend application at a localhost address, e.g., 127.0.0.1:8080.

The sidecar approach is agnostic to the networking fabric. It works across different types of infrastructure, and works even if the services use a first software-defined networking (SDN) technology on one type of cloud provider, and the cell 302 uses a different second SDN technology. Callers including the application 110 are identified with cryptographic security. Accordingly, the sidecar approach does not require one to trust the infrastructure network.

In the example shown, the sidecar program 112 operates inside of the application container 102. In some implementations, the sidecar program 112 can operate outside of the application container 102 and in the cell 302. Executing the sidecar program 112 in the cell 302 outside of the application container 102 is advantageous in terms of resource usage. Placing the sidecar program 112 inside the application container 102 is advantageous in that the sidecar program 112 can use the cryptographic identity of the application container 102, when various credentials, e.g., certificates and private keys are placed inside the application container 102. Another advantage for placing the sidecar program 112 inside the application container 102 is simplicity. A sidecar in the cell 302 would need to be safe for use by multiple tenants, while a sidecar inside the application container 102 can be untrusted.

In the example shown, the transformer 310 or transformer 312 transforms the credentials block provided by the service broker 308. In some implementations, the credentials block can be kept intact. The hostname in the credentials block can be a name known to a domain name system (DNS) for the application container 102, referred to as a container DNS. The container DNS can resolve the hostname to a localhost IP address, e.g., 127.0.0.10. If the service 114 listens on port 8080, the sidecar program 112 would need to listen on 127.0.0.10:8080. Then when the application 110 starts and tries to bind to port 8080 on all interfaces, the application 110 may get an error, since the sidecar program 112 is already listening on port 8080 on the loopback interface. The container DNS can resolve the hostname to a random localhost IP address, e.g., 127.0.45.132. A DNAT iptables rule inside the application container 102 can redirect all traffic for that IP address, regardless of destination port, to the correct sidecar listener, e.g., 127.0.0.10:30001. The container DNS can resolve the hostname to an IP address of the cell 302, e.g., 169.254.0.3, in implementations where the sidecar resides outside of the application container 102 and in the cell. The container DNS can resolve the hostname to an IP address that is in a different network namespace. This way, the listener of the sidecar program 112 can bind to any port without conflicting with the ports used by the application 110.

When the hostname of the service 114 is not known by a container DNS, a DNAT iptables rule can redirect packets from the application 110 to the sidecar program 112 inside the application container 102. The iptables rules can be maintained inside the container. In implementations where the sidecar program 112 is outside of the application container 102 but inside of the cell 302, a DNAT iptables rule can redirect the packets to the sidecar program 112 on the cell 302.

Figure 4:
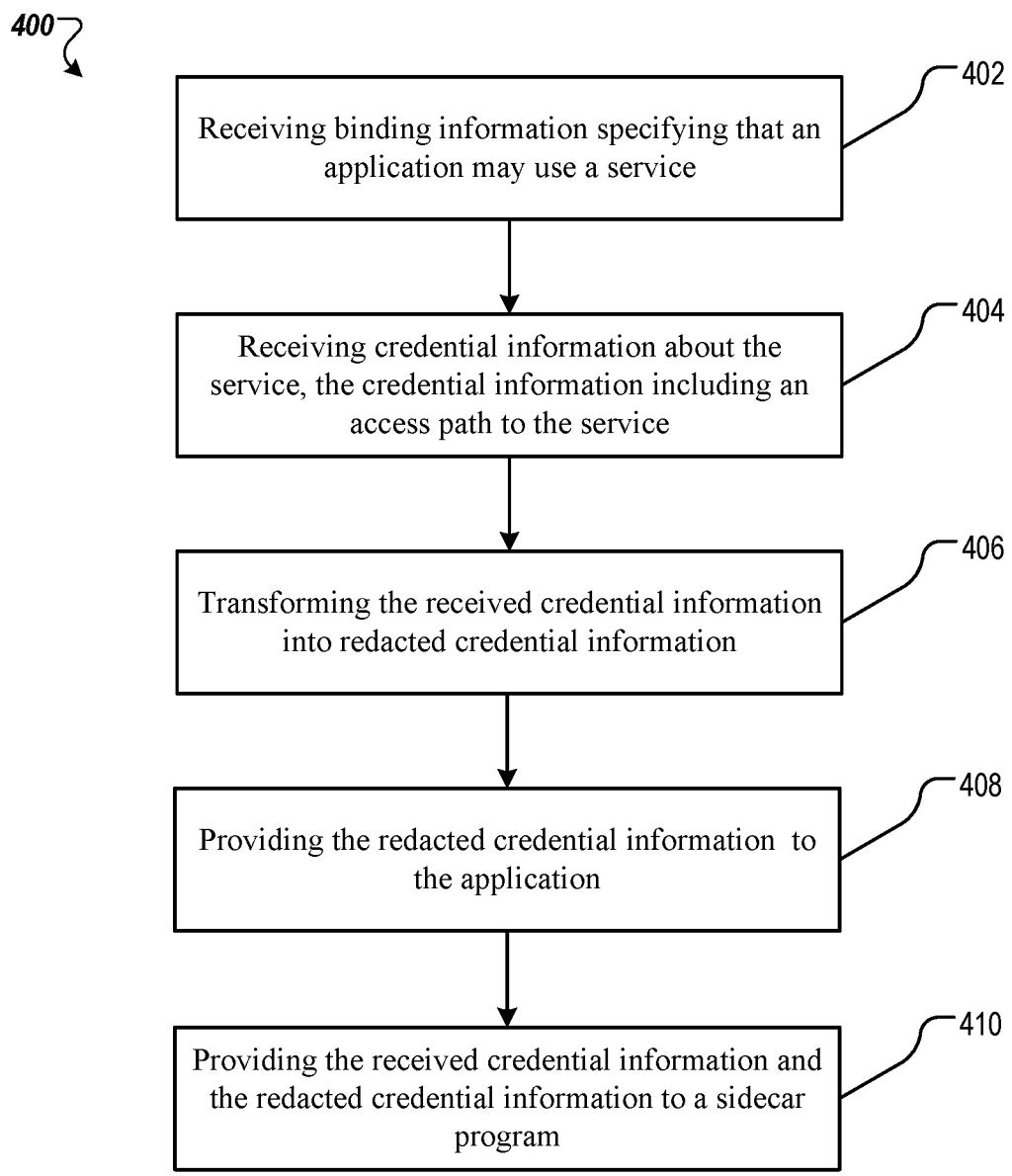
FIG. 4 is a flowchart illustrating an example transformation process for providing sidecar-backed services on a cloud computing platform.

FIG. 4 is a flowchart illustrating an example transformation process 400 for providing sidecar-backed services on a cloud computing platform. The process 400 can be performed by a system including one or more processors programmed to perform operations including those described above in reference to the transformer 310 or 312 of FIG. 3

The system receives (402), from a cloud controller of a cloud computing platform, binding information specifying that an application may use a service provided on the cloud computing platform.

The system receives (404), from the cloud controller, credential information about the service. The credential information includes an access address to the service. The received credential information can include a credential block specifying a user name and a password for accessing the service. The credential block can include the access address. The access address can include a hostname, e.g., an IP address or an URI, of the service. The access address can include a port number where the service listens.

The system transforms (406) the received credential information into redacted credential information. The transformation includes replacing the access address with a localhost address to a sidecar program associated with the application. The sidecar program executes on a computer hosting the application. The localhost address includes a port number and localhost hostname, e.g., a localhost IP address, indicating the computer hosting the instance of the application and the associated sidecar program.

In some implementations, the transformation includes replacing the access address with a virtual address. The virtual address can include a virtual IP address (VIP). The VIP can be an address from a reserved range, e.g., modeled on Kubernetes VIPs. A network DNAT rule inside a container's namespace can translate that VIP into a true localhost hostname and port of a listener of the sidecar program.

The redacted credential information can have a name in the hostname field. The name can resolve into either a localhost hostname, e.g., IP address, of a sidecar listener, or a VIP. Resolving the name into the localhost hostname or a VIP can be through a parameter, e.g., "/etc/hosts" in some systems in the container, or through a DNS service. An advantage of using the VIP is that the VIP approach provides one or two extra layers of indirection. The indirection allows the binding-credential transformation operations to be performed only once per service instance, in a central location.

In some implementations, the transformation preserves the port number in the access address. A DNAT rule inside a container's namespace can match any packets destined for the sidecar listener's hostname or service VIP, and rewrite the destination port to that of the listener. An advantage of using the DNAT rule to match the packets is that this approach works with service bindings that do not contain explicit port fields, or with applications that assume that a service is always available on standard ports.

The system provides (408) the redacted credential information to the application. The redacted credential information and the binding information can cause the application to access the localhost address when using the service, instead of accessing the service directly.

The system provides (410) the received credential information and the redacted credential information to the sidecar program. The received credential information and the redacted credential information can cause the sidecar program to listen at the localhost address and to communicate with the service at the access address in response to receiving a request from the application at the localhost address.

In some implementations, the sidecar program is an application-side program that is located, with the application, in an application container. The sidecar program can be configured to perform at least one of discovering the service, establishing a secure connection to the service, load-balancing subsequent requests across a plurality of instances of the service, retrying connection in response to network interruption, or forwarding metrics of the request to a metric collector. The service can be associated with a service sidecar program. The application communicates with the service through both the application sidecar program and the service sidecar program. Communication between the application sidecar program and the service sidecar program is through a sidecar-to-sidecar MTLS tunnel.

In some implementations, the system can receive, from the cloud controller, update information indicating that the application is bound to a new service. For example, the application can switch to a newer version of a database. While the application is executing, the system can update at least one of the received credential information or the redacted credential information. The updating occurs on the sidecar program. The updating can cause the application to use the new service through the sidecar program without interruption.

In some implementations, the service, e.g., the external service 118 of FIGS. 1 and 3, is a service that is hosted outside of the computing platform. The service may allow access only from designated addresses. The sidecar program is configured to access the service through the designated addresses, as described in reference to FIG. 3.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method, comprising:
   receiving, by one or more processors from a cloud controller of a cloud computing platform, binding information specifying that an application may use a service provided on the cloud computing platform;
   receiving, by the one or more processors from the cloud controller, credential information about the service, the credential information including an access address to the service;
   transforming, by the one or more processors, the received credential information into redacted credential information, including replacing the access address with a localhost address to a sidecar program associated with the application, the sidecar program executing on a computer hosting the application;
   providing, by the one or more processors to the application, the redacted credential information, the redacted credential information and the binding information operable to cause the application to access the localhost address when using the service; and
   providing, by the one or more processors to the sidecar program, the received credential information and the redacted credential information, the received credential information and the redacted credential information operable to cause the sidecar program to listen at the localhost address and to communicate with the service at the access address in response to receiving a request from the application through the localhost address.

2. The method of claim 1, wherein the received credential information includes a user name and a password for accessing the service, the access address includes a hostname of the service and a port number of the service, the localhost address includes a port number and localhost hostname indicating the computer hosting the application and the associated sidecar program.

3. The method of claim 1, wherein the sidecar program is an application-side program that is located, with the application, in an application container, the sidecar program configured to perform at least one of discovering the service, establishing a secure connection to the service, load-balancing subsequent requests across a plurality of instances of the service, retrying connection in response to network interruption, or forwarding metrics of the request to a metric collector.

4. The method of claim 3, wherein the service is associated with a service sidecar program, and the application communicates with the service through both the application sidecar program and the service sidecar program.

5. The method of claim 4, wherein communication between the application sidecar program and the service sidecar program is through a sidecar-to-sidecar mutual transport layer security (MTLS) tunnel.

6. The method of claim 1, comprising:
   receiving, from the cloud controller, update information indicating that the application is bound to a new service; and
   while the application is executing, updating at least one of the received credential information or the redacted credential information, the updating causing the application to use the new service through the sidecar program without interruption.

7. The method of claim 1, wherein:
   the service is a service that is hosted outside of the cloud computing platform and allows access only from designated addresses, and the sidecar program is configured to access the service through the designated addresses.

8. A system comprising:
one or more computers; and
one or more storage devices which store instructions that are operable, when executed by the one or more computers, to cause the one or more computers to perform operations comprising:
receiving, by one or more processors from a cloud controller of a cloud computing platform, binding information specifying that an application may use a service provided on the cloud computing platform;
receiving, by the one or more processors from the cloud controller, credential information about the service, the credential information including an access address to the service;
transforming, by the one or more processors, the received credential information into redacted credential information, including replacing the access address with a localhost address to a sidecar program associated with the application, the sidecar program executing on a computer hosting the application;
providing, by the one or more processors to the application, the redacted credential information, the redacted credential information and the binding information operable to cause the application to access the localhost address when using the service; and
providing, by the one or more processors to the sidecar program, the received credential information and the redacted credential information, the received credential information and the redacted credential information operable to cause the sidecar program to listen at the localhost address and to communicate with the service at the access address in response to receiving a request from the application through the localhost address.

9. The system of claim 8, wherein the received credential information includes a user name and a password for accessing the service, the access address includes a hostname of the service and a port number of the service, the localhost address includes a port number and localhost hostname indicating the computer hosting the application and the associated sidecar program.

10. The system of claim 8, wherein the sidecar program is an application-side program that is located, with the application, in an application container, the sidecar program configured to perform at least one of discovering the service, establishing a secure connection to the service, load-balancing subsequent requests across a plurality of instances of the service, retrying connection in response to network interruption, or forwarding metrics of the request to a metric collector.

11. The system of claim 10, wherein the service is associated with a service sidecar program, and the application communicates with the service through both the application sidecar program and the service sidecar program.

12. The system of claim 11, wherein communication between the application sidecar program and the service sidecar program is through a sidecar-to-sidecar mutual transport layer security (MTLS) tunnel.

13. The system of claim 8, the operations comprising:
receiving, from the cloud controller, update information indicating that the application is bound to a new service; and
while the application is executing, updating at least one of the received credential information or the redacted credential information, the updating causing the application to use the new service through the sidecar program without interruption.

14. The system of claim 8, wherein:
the service is a service that is hosted outside of the cloud computing platform and allows access only from designated addresses, and
the sidecar program is configured to access the service through the designated addresses.

15. One or more non-transitory storage devices storing instructions that are operable, when executed by one or more computers, to cause the one or more computers to perform operations comprising:
receiving, by one or more processors from a cloud controller of a cloud computing platform, binding information specifying that an application may use a service provided on the cloud computing platform;
receiving, by the one or more processors from the cloud controller, credential information about the service, the credential information including an access address to the service;
transforming, by the one or more processors, the received credential information into redacted credential information, including replacing the access address with a virtual address that is mapped to a sidecar program associated with the application by a destination network address translation (DNAT) rule, the sidecar program executing on a computer hosting the application;
providing, by the one or more processors to the application, the redacted credential information, the redacted credential information and the binding information operable to cause the application to access the virtual address when using the service; and
providing, by the one or more processors to the sidecar program, the received credential information and the redacted credential information, the received credential information and the redacted credential information operable to cause the sidecar program to listen at the virtual address and to communicate with the service at the access address in response to receiving a request from the application through the virtual address.

16. The one or more non-transitory storage devices of claim 15, wherein the received credential information includes a user name and a password for accessing the service, the access address includes a hostname of the service and a port number of the service, the virtual address includes an address from a reserved range of addresses.

17. The one or more non-transitory storage devices of claim 15, wherein the sidecar program is an application-side program that is located, with the application, in an application container, the sidecar program configured to perform at least one of discovering the service, establishing a secure connection to the service, load-balancing subsequent requests across a plurality of instances of the service, retrying connection in response to network interruption, or forwarding metrics of the request to a metric collector.

18. The one or more non-transitory storage devices of claim 17, wherein the service is associated with a service sidecar program, and the application communicates with the service through both the application sidecar program and the service sidecar program.

19. The one or more non-transitory storage devices of claim 18, wherein communication between the application sidecar program and the service sidecar program is through a sidecar-to-sidecar mutual transport layer security (MTLS) tunnel.

20. The one or more non-transitory storage devices of claim 15, the operations comprising:
- receiving, from the cloud controller, update information indicating that the application is bound to a new service; and
- while the application is executing, updating at least one of the received credential information or the redacted credential information, the updating causing the application to use the new service through the sidecar program without interruption.

* * * * *